350-3.74
SR
XR 3,743,421
SEARCH ROOM

United State
X 3052 H
Maloney
SUBSTITUTE FOR MISSING XR
[11] 3,743,421
[45] July 3, 1973

[54] SYSTEM FOR IDENTIFYING PERSONNEL BY FINGERPRINT VERIFICATION AND METHOD THEREFOR

[75] Inventor: William T. Maloney, Sudbury, Mass.

[73] Assignee: Sperry Rand Corporation, New York, N.Y.

[22] Filed: July 2, 1971

[21] Appl. No.: 159,382

[52] U.S. Cl. ..... 356/71, 250/219 DQ, 340/146.3 E, 356/166, 356/168
[51] Int. Cl. .......................... G06k 9/08, G01b 11/24
[58] Field of Search ...................... 356/71, 164, 165, 356/166, 168; 250/219 CR, 219 DQ; 340/146.3 E

[56] References Cited

UNITED STATES PATENTS

| | | | |
|---|---|---|---|
| 3,619,060 | 11/1971 | Johnson | 356/71 |
| 3,511,571 | 5/1970 | Ogle | 340/146.3 E |
| 3,532,426 | 10/1970 | Lemmond | 356/71 |
| 3,200,701 | 8/1965 | White | 356/71 |
| 2,625,076 | 1/1953 | Nosco | 356/166 |

OTHER PUBLICATIONS

"Credit Card System" Schuenzel et al.; IBM Technical Disclosure Bulletin; Vol. 13, No. 1, June 70, pgs. 176 & 177.

*Primary Examiner*—Ronald L. Wibert
*Assistant Examiner*—V. P. McGraw
*Attorney*—S. C. Yeaton

[57] ABSTRACT

An optical recognition device which employs a source of incoherent quasi-monochromatic light for illuminating an input prism upon which a fingertip to be verified as that of a particular individual is pressed. Reflected incoherent illumination from the prism is passed through a hologram selected from a library of holograms which contains interference patterns produced from the fingertip or an impression of the fingertip of the particular individual. An intensity output signal provided at the hologram output is directed to a discriminator which passes the central value signal of the intensity output signal and a detector responsive to the central value of the intensity signal provides an electrical current output which is coupled into a signal processor. The signal processor has threshold levels which correspond to values of electrical current signals required to establish correspondence between the reflected incoherent illumination from the input prism with the fingertip pressed against it and the interference patterns contained in the hologram. The signal processor produces an output signal which indicates correspondence between the fingertip pressed against the input prism and the fingertip represented by the interference patterns.

18 Claims, 4 Drawing Figures

INVENTOR
WILLIAM T. MALONEY
BY
HP Terry
ATTORNEY

PATENTED JUL 3 1973

3,743,421

SHEET 2 OF 3

INVENTOR
WILLIAM T. MALONEY
BY
H P Terry
ATTORNEY

INVENTOR
WILLIAM T. MALONEY
BY
H P Terry
ATTORNEY

SYSTEM FOR IDENTIFYING PERSONNEL BY FINGERPRINT VERIFICATION AND METHOD THEREFOR

BACKGROUND OF THE INVENTION

1. Field of the Invention

The present invention relates to the art of personnel identification by verifying a fingerprint to be the same as the fingerprint of a particular individual. This system relates more specifically to devices that employ spatial filtering provided by pre-recorded interference patterns on a hologram for the recognition of an incoherently illuminated fingerprint.

2. Description of the Prior Art

Historically, personnel identification systems usually employed a pass, badge, credit card or other article issued to a person to be identified. Subsequently, the bearer of the pass, badge, credit card or article would be recognized as the person to whom the identifying article was issued. These devices suffered in that they could be readily altered or tampered with so that the bearer could not be identified as the person who had been issued the identifying article. For instance, if a picture were employed, the subsequent possessor of the identifying article could very easily transfer a picture of himself for that of the person to whom the identifying article is issued. Recently, a great deal of effort has been expended in the area of fingerprint verification to use in identifying personnel. Prior art fingerprint verification systems utilize a photographic input of the fingerprint resulting in a considerable time delay to process the photographic input. These systems are inconvenient because of the time delay required for the user; further many applications can not tolerate the waiting time inherent in such systems. For example, large numbers of employees entering and leaving a secured area could not be readily processed nor could customers in a business establishment using credit card accounts be serviced in a reasonable time by such a time consuming operation.

Prior art systems are known which use a scanning technique or a point by point comparison between the fingerprint or recording thereof of the fingerprint to be verified and a photographic transparency of the known fingerprint for determining the degree of correlation between them. These systems are extremely complex and usually employ a computer thereby greatly increasing the cost.

In another prior art apparatus light is transmitted through a photographic transparency of a known fingerprint to produce an optical pattern thereof. The light containing the optical pattern impinges on a first surface of a prism. A finger having an unknown fingerprint to be verified is pressed against a second surface of the prism which produces an optical pattern of the unknown fingerprint. As a result of total reflection at the second surface the pattern produced selectively transmits from a third surface a collimated light beam containing the optical pattern of the known fingerprint. The degree of correlation between the known and the unknown fingerprints is indicated by the amount of light in the collimated beam.

SUMMARY OF THE INVENTION

The subject invention provides an economical improved real-time system for identifying personnel through the verification of fingerprints by utilizing a lensless optical recognition system. The individual to be identified places a specific finger on one face of a prism input device. The prism is illuminated by incoherent quasi-monochromatic light which is reflected from those areas of the input surface of the prism adjacent to the troughs of the fingertip. The reflected beam is incident upon a hologram from a library of holograms which contains interference patterns prerecorded from positive and negative transparencies of the fingerprint of the known individual. Alternatively, each hologram may contain interference patterns produced from fingerprints of more than one known individual. An intensity output signal is provided by the hologram in response to the impinging incoherent quasi-monochromatic illumination reflected from the input device. Correlation functions of the intensity pattern of the input fingerprint are formed with the intensity transmission functions of the positive and negative transparencies that contained the fingerprint of each known individual at apertures which are disposed in the same locations as that occupied during the recording process by the positive and negative transparencies.

Photodetectors are positioned behind each aperture for producing electrical current signals in response to the central values of the intensity correlation functions received from each aperture. The electrical current output signals are processed in a post processor that has threshold values which correspond to the maximum and minimum values required to indicate correlation between the fingerprint pressed against the input device and the fingerprint of the known individual represented by the interference patterns produced from the positive and negative transparencies during the recording process.

Further, this invention discloses a method for verifying fingerprints by superimposing an image of a first color produced from the fingerprint to be verified upon images of a second color obtained from the hologram containing the interference patterns produced from the positive and negative transparencies of the known fingerprint.

DESCRIPTION OF THE PREFERRED EMBODIMENT

Figure 1:
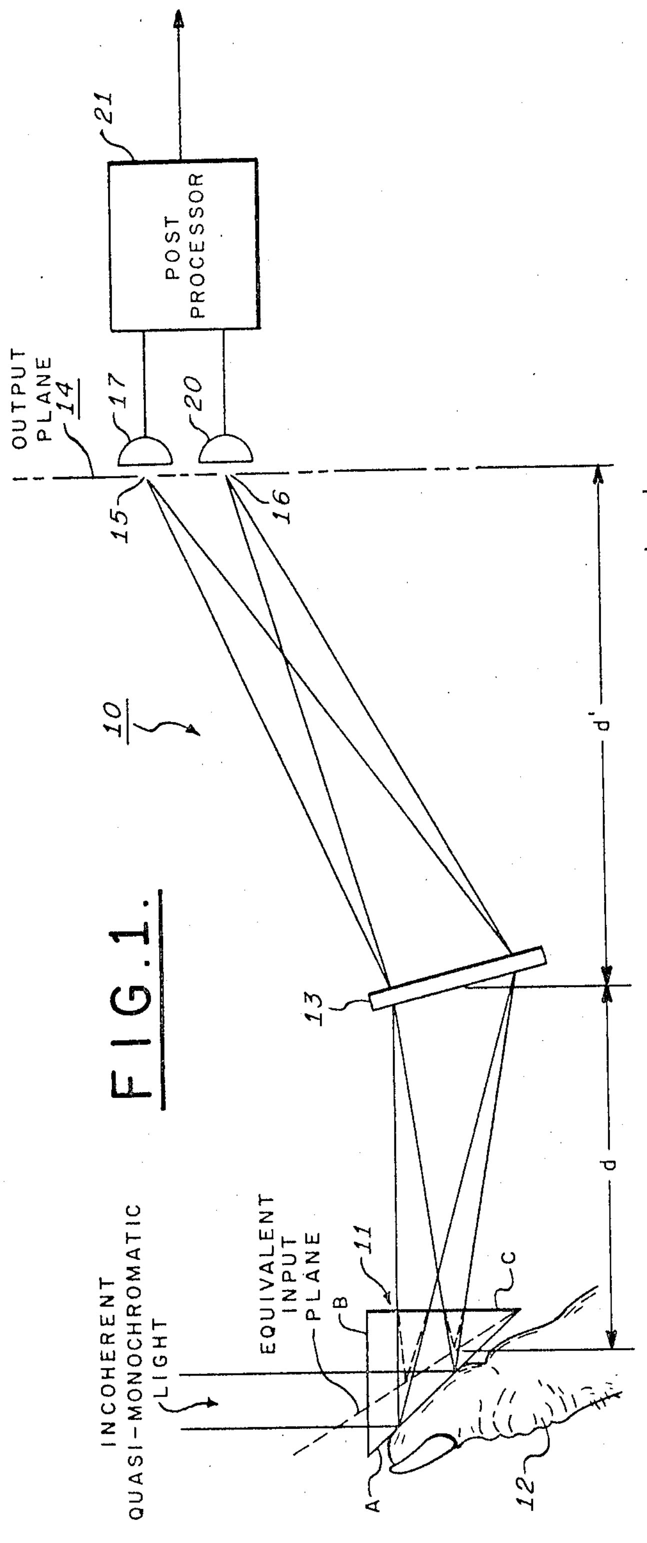
FIG. 1 is a simplified schematic diagram illustrating the real time correlation of a fingertip against a holographically stored fingerprint.

An optical recognition device 10 for verifying fingerprints is illustrated in FIG. 1 and includes an input prism 11 having 3 faces designated A, B, and C. A fingertip 12 to be verified is pressed against the surface A of the input prism 11 and incoherent quasi-monochromatic light incident on the surface B passes through the prism 11 and reflects off the areas of the surface A which are not in contact with the troughs or valleys of the fingertip 12. It should be understood that wherever "incoherent quasi-monochromatic light" is specified, "diffuse monochromatic light" may be substituted. In the absence of the fingertip 12 the incoherent light would be totally reflected from the surface A and pass through the surface C. Application of the fingertip 12 results in frustrating the internal reflection of the incoherent light at the surface A. As a result the ridges of the fingertip which are in contact with the surface A absorb the incident incoherent light frustrating reflection from these areas. Whereas the areas proximate the valleys of the fingertip 12 provide internal reflection of the incoherent light incident thereon.

The reflected incoherent light which passes through the surface C contains information on the light areas corresponding to the valleys of the fingertip 12 and on the dark areas corresponding to the ridges of the fingertip 12. This light is directed toward the hologram 13 which may contain a plurality of interference patterns formed from transparencies of finger prints from one or more identified individuals. The hologram 13 produces one or more intensity output functions which are indicative of the degree of correspondence between the fingertip 12 and a specific fingerprint represented by the interference patterns in the hologram 13. Apertures 15 and 16 disposed in the output plane 14 pass the central value of the intensity functions produced by the hologram 13.

Photo detectors 17 and 20 are responsive to the central values passed by the apertures 15 and 16 and produce electrical current signals having amplitudes proportional to the intensity of the central values. A post processor 21 connected to the photo detectors 17 and 20 includes a preset threshold level for each detector. When an electrical current signal received from the optical detectors 17 or 20 exceeds one of the preset thresholds, an output signal is produced which indicates correlation or lack of correlation between the fingertip 12 pressed against the input prism and the fingerprint represented by the interference patterns in the hologram 13.

Figure 2:
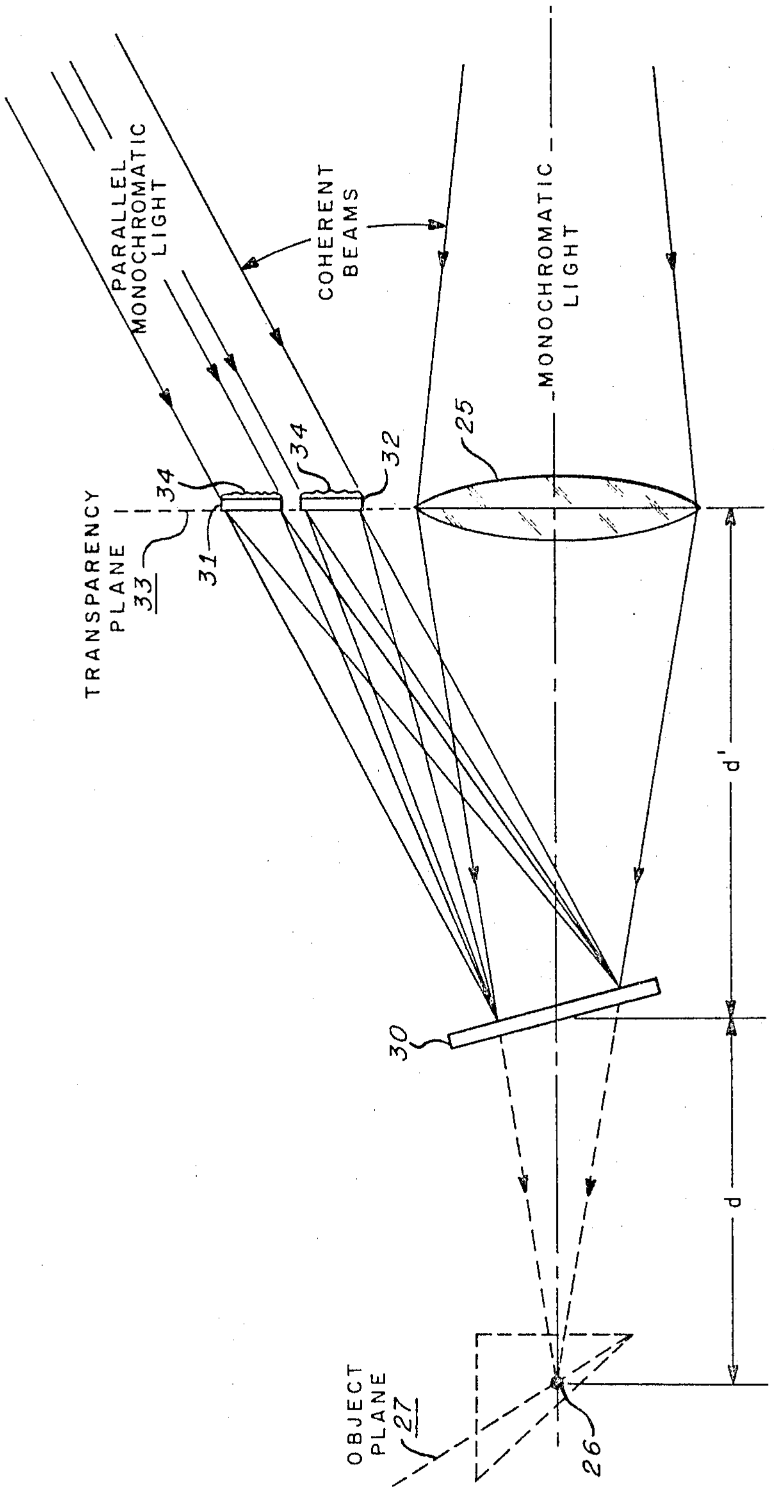
FIG. 2 is a simplified schematic diagram illustrating the recording of positive and negative transparencies of a known fingerprint onto photographic film.

In order to provide a high degree of confidence in the correlation check provided by this device, two transparencies, 31 and 32 as shown in FIG. 2, which represent the fingerprint of an identified individual are recorded on the hologram 13 for each fingerprint stored. The first is a positive transparency 31 and the second is a negative transparency 32. For best efficiency and signal-to-noise ratio, the transparencies should be illuminated consecutively and half of the available photographic plate area should be used for recording each transparency.

The interference pattern in the hologram 13 corresponding to the positive transparency 31 will produce a maximum central intensity value at the output aperture 15 in response to the incoherent light from the input prism 11. The interference patterns which correspond to the negative transparency 32 produce a minimum central intensity value at the output aperture 16 in response to the incoherent light reflected from the input prism 11.

FIG. 2 illustrates a method for recording holograms on a photographic plate 30 that includes a converging monochromatic light beam from a lens 25 that converges to a diffraction spot at a reference point 26 which is located in an object plate 27 to the left of the photographic plate 30.

The distances *d* and *d'* of FIG. 1 are equal respectively to the distances *d* and *d'* of FIG. 2 when the wavelength of the incoherent illumination reflected from the input prism 11 in FIG. 1 is approximately equal to the wavelength of the converging monochromatic light beam in FIG. 2. However, if these wavelengths are not approximately equal, the distances *d* and *d'* used in the recognition process shown in FIG. 1 will not be equal respectively to the distances *d* and *d'* in the recording process of FIG. 2. Variations in these distances will be required where possible to compensate for differences in the wavelengths.

The lens 25 is required to produce a diffraction spot at the reference point 26 that is small relative to the thickness of a ridge or valley in the fingerprint to be recorded. Further, the lens 25 must be isoplanatic over dimensions which are greater than the dimensions of the fingertip pressed against the input prism 11.

The parallel monochromatic light beam is coherent with the converging beam, transmits through the positive transparency 31, and then impinges on one-half the useful area of the photographic plate 30. A diffuser 34 may be employed to improve distribution of the illumination from the parallel monochromatic light beam over one-half the useful surface area of the photographic plate 30. Simultaneously, a spherical wave front from the lens 25 coherent with the parallel monochromatic light beam impinges on the photographic plate 30 overlapping the parallel monochromatic light beam. Illumination of the photographic plate 30 by the monochromatic light beam forms an interference pattern corresponding to the positive transparency 31 of the fingerprint from the identified individual. Subsequently, the parallel monochromatic light beam is transmitted through the negative transparency 32 also located in the transparency plane 33 and then impinges on the other half of the useful area of the photographic plate 30. Again the spherical wave front from the lens 25 simultaneously impinges on the photographic plate 30 overlapping the parallel monochromatic light beam. Illumination of the photographic plate 30 by the monochromatic light beams forms an interference pattern which corresponds to the negative transparency 32 of the fingerprint of the identified individual.

In an alternate embodiment positive and negative transparencies of fingerprints from a plurality of identified individuals may be recorded on selected areas of the photographic plate 30. In this embodiment, the useful area of the photographic plate 30 would be first divided into a number of sections corresponding to a particular number of individuals and each section would be subdivided in half to accommodate a positive and negative transparency for each individual. This technique would produce a minimum number of photographic plates and reduce the space required for filing the recorded transparencies. In constructing this library of positive and negative transparencies the parallel monochromatic light beam would be restricted to only one-half of each section of the useful area of the photographic plate 30 and the recording angle would also be varied for each positive transparency 31 and each negative transparency 32 respectively. As a result the interference patterns corresponding to each transparency would be spatially displaced from left to right and from top to bottom within the photographic plate 30.

As would be obvious to those skilled in the art, for parallel processing the number of detector apertures and detectors required is equal to the total number of positive and negative transparencies recorded.

In one form of operation an individual would present the pass, badge, credit card or other article of identification which incorporates a hologram 13 to a user of the optical recognition device 10. The user would insert the article containing the hologram 13 into the device 10 at a position located a distance $d$ to the right of the input prism. The bearer of the article would press his corresponding fingertip 12 on to the surface A of the input prism 11. A source of incoherent quasi-monochromatic light would be applied to the surface B to backlight the input prism 11. Frustrated internally reflected incoherent light containing information on the light and dark regions corresponding to the ridges and valleys of the fingertip 12 would be directed to the hologram 13.

Intensity correlation functions would be produced by the hologram 13 at the output plane 14. If the positive transparency is represented by transparency 31 in FIG. 2 and the negative transparency is represented by transparency 32 then the aperture 15 in FIG. 1 will pass the central value of a first intensity correlation signal and the aperture 16 will pass the central value of a second intensity signal. The photo detector 17 will produce a maximum current signal in response to the central value of the first intensity function passed by aperture 15 and the photo detector 20 will pass a minimum electrical current signal in response to the central value of the second intensity function passed by aperture 16.

The electrical current signals produced by the photo detectors 17 and 20 are connected into respective threshold circuits in the post processor 21. If the electrical current signal received from the photo detector 17 is greater than its corresponding threshold level and the electrical current signal received from photo detector 20 is less than its respective threshold level, then the two outputs from the threshold level circuits are combined to provide an output indication indicative of correspondence between the fingertip 12 pressed against the input prism and the fingertip represented by the interference patterns on the hologram 13.

An alternative form of operation involves a system wherein the hologram 13 contains a library of pairs of interference patterns representing a library of stored fingerprint patterns and where, correspondingly, the output plane 14 contains a number of apertures and detectors equal to the number of transparencies recorded on the hologram. Under proper operation, only one pair of photo-detectors, namely those associated with the positive and negative transparencies which correspond to the fingerprint presented at the input will produce currents respectively greater than and less than their threshold currents. The processor will thus identify the fingerprint at the input as corresponding to that from which this pair of positive and negative transparencies was made. In this form of operation, the hologram is stored in the recognition machine and is not presented by the individual as in the former case.

Figure 3:
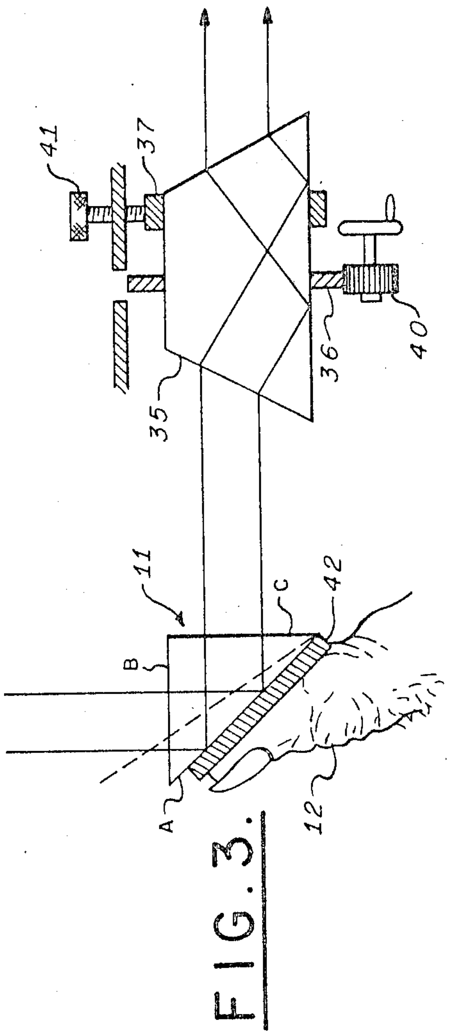
FIG. 3 is a simplified schematic diagram which illustrates the use of a dove prism to obtain registration between the fingertip and stored fingerprint.

Of particular importance in this device is the registration required between the fingerprint represented by the reflected light beam from the input prism 11 and the interference patterns representing the fingerprint of the identified individual contained in the hologram 13. FIG. 3 shows an embodiment of this invention that includes a dove prism 35 which is useful in meeting the registration requirement of this device. It should be understood that the beam in FIG. 3 emanating from the surface C of prism 11 is shown to be very well collimated as a drawing simplification; in fact the collimation of this beam may be very poor. The dove prism 35 is disposed within a first geared collar 36 which may be rotated by a suitable means 40. Since the dove prism 35 rotates the transmitted light 2° for each degree of rotation of the dove prism 35 it would require only 180° of rotation of the dove prism 35 to produce 360° of rotation of the reflected incoherent light beam from the input prism 11. However, with a suitable guard 42 affixed to the surface A of the input prism, the amount of rotation required to obtain registration could be kept to a minimum; for example, less than 10°.

The dove prism 35 is also disposed within a second collar 37. This collar and its associated control means 41 provide translation of the dove prism assembly in a vertical direction. Therefore, by proper adjustment of the control means 40 and 41 the required rotational registration and registration in one lateral dimension between the reflected incoherent light beam from the input prism 11 and the interference patterns on the hologram 13 may be obtained.

Alternatively, registration may be obtained by rotating and translating the hologram 13, the apertures 15, 16 and their associated photo detectors 17 and 20. Further, some lateral positioning is possible by translating the hologram 13 alone.

Figure 4:
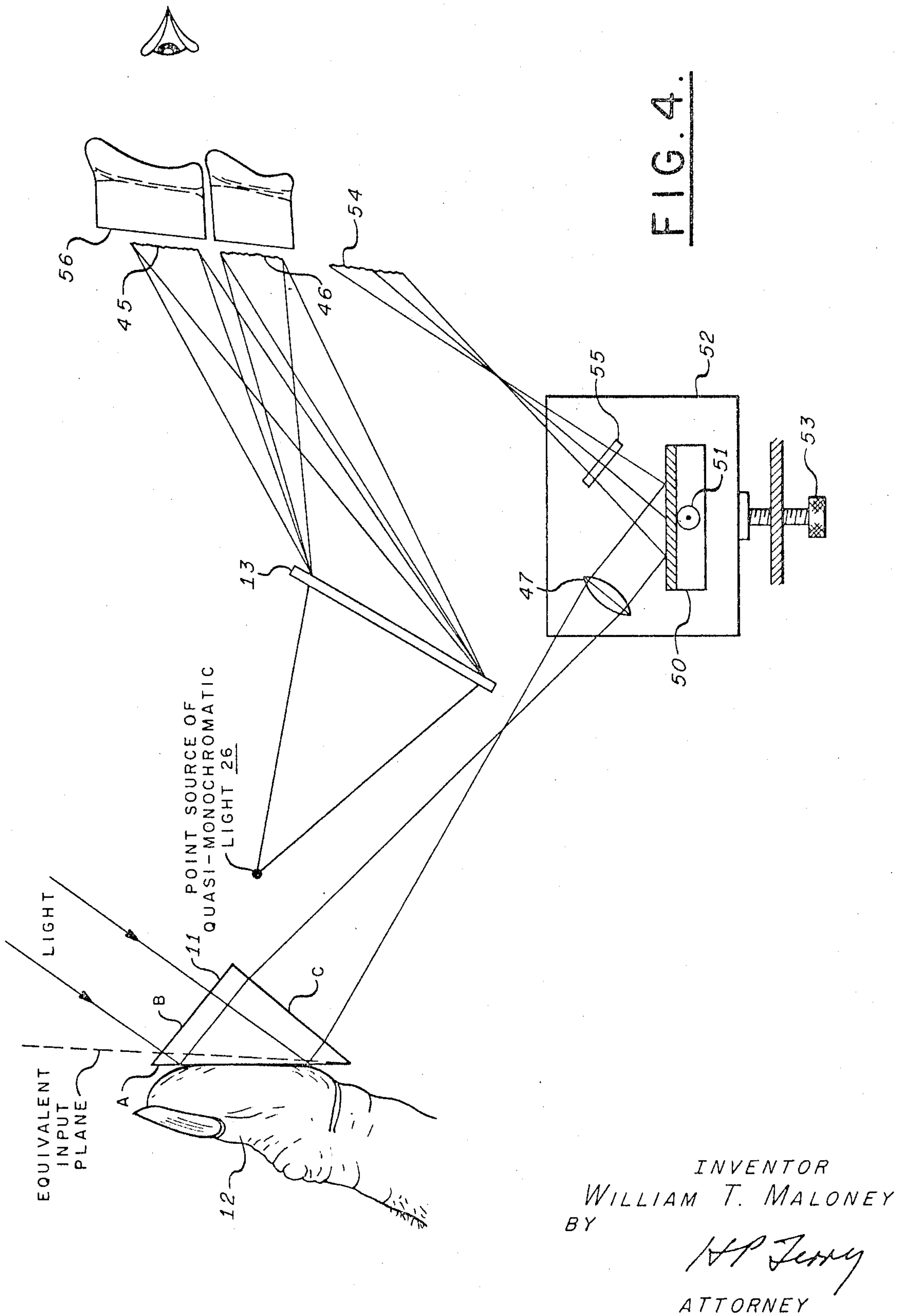
FIG. 4 is a diagram useful in explaining the method of verification by sequentially superimposing the image of the fingertip over the images produced by the holographic plate.

The subject invention includes a provision for visually correlating the input fingertip 12 against the interference patterns which represent the positive and negative transparencies 31 and 32 of a fingertip from a known individual. This feature could be employed in those instances where there was a failure to obtain an identification in the automatic system described above with respect to FIGS. 1, 2 and 3. The visual comparison feature is illustrated in FIG. 4, which shows the input prism 11 having the fingertip to be verified pressed against the surface A, light incident upon surface B and the reflected light transmitted through the surface C.

The hologram 13 is illuminated from a point source of quasi-monochromatic light located at a point 26 which is positioned with respect to the hologram 13 at the same location as the reference point 26 in FIG. 2 during the recording process. Images 45 and 46 of the fingerprints stored on the positive and negative transparencies 31 and 32 respectively will be reconstructed on a screen 56 in the positions occupied by the positive and negative transparencies 31 and 32 during the recording process. The reflected incoherent light beam transmitted through the surface C of the input prism 11 will be imaged by lens 47 on the screen 56 after reflection from a reflecting surface 50 rotatable about an axis 51. The reflecting surface 50 is mounted on a plate 52 which may be translated in a vertical direction by control means 53. The reflecting surface 50 provides an output which produces an image 54 of the fingertip 12 pressed against the input prism 11. The image 54 is of the same scale as the images 45 and 46 which correspond to the fingerprints on the positive and negative transparencies 31 and 32 respectively. The quasi-monochromatic nature of the point source produces images 45 and 46 in identical colors.

A color filter 55 disposed between the reflecting surface 50 and the image 54 provides an image of a different color from the images 45 and 46. By rotating the reflecting surface 50 and translating the mounting plate 52 with control means 53 the image 54 may be superimposed consecutively on the images 45 and 46. If required a dove prism inserted in the optical path between the prism surface C and the image 54 on the screen 56 can be used to provide rotational adjustment as described above. If the color of the image 54 on the screen 56 is made to be comptementary to that of the point source 26 then when the image 54 is superimposed on the image 45 which corresponds to the positive transparency 31, the fingertip 12 may be verified by observing the absence of the colors produced by the point source 26 and filter 55. By subsequently superimposing the image 54 on the image 46 which corresponds to the negative transparency, the fingertip 12 may be further verified by observing the presence of the colors produced by the point source 26 and the filter 55.

While the invention has been described in its preferred embodiments, it is to be understood that the words which have been used are words of description rather than limitation and that changes may be made within the purview of the appended claims without departing from the true scope and spirit of the invention.

I claim:

1. A lensless optical recognition device for identifying personnel by fingerprint verification comprising, a source of quasi-monochromatic incoherent illumination, input means illuminated by said quasi-monochromatic incoherent illumination in which a fingertip to be verified as the fingertip of a particular individual is pressed against said input means, holographic means having interference patterns produced from said fingertip or an impression of said fingerprint of said particular individual, said holographic means providing an intensity output signal in response to said incoherent illumination reflected from said input means, discriminator means for receiving said intensity output signal and passing a central value signal corresponding to the central value of said intensity output signal, detector means responsive to said central value signal passed by said discriminator means for providing an electrical output signal in accordance with said central value signal, and signal processing means coupled to said detector means having threshold levels which correspond to values of electrical signals required to establish correspondence between said reflected incoherent illumination and said interference patterns, said signal processing means providing an output signal in response to said electrical output signal thereby verifying that said fingertip pressed against said input means is the same as said fingertip represented in said holographic interference pattern.

2. A lensless optical recognition device as described in claim 1 in which said holographic means includes interference patterns from fingertips of a plurality of known individuals including said particular individual.

3. A lensless optical recognition device as described in claim 1 which includes optical means disposed between said input means and said holographic means for rotating and translating said reflected incoherent illumination with respect to said holographic means.

4. A lensless optical recognition device as described in claim 3 in which said optical means includes a dove prism.

5. A lensless optical recognition device as described in claim 1 which includes means for rotating said holographic means, said discriminator means and said detector means simultaneously with respect to said input means.

6. A lensless optical recognition device as described in claim 1 which includes means for rotating and translating said holographic means, said discriminator means and said detector means simultaneously with respect to said input means.

7. A lensless optical recognition device as described in claim 1 which includes optical fiber transmission lines coupled between said discriminator means and said detector means.

8. A lensless optical recognition device as described in claim 7 which includes means for rotating and translating said holographic means and said discriminator means simultaneously with respect to said input means.

9. A lensless optical recognition device for identifying personnel by fingerprint verification comprising, a source of quasi-monochromatic incoherent illumination, input means illuminated by said quasi-monochromatic incoherent illumination in which a fingertip to be verified as the fingertip of a particular individual is pressed against said input means, holographic means having interference patterns produced from positive and negative transparencies of impressions of said fingertips of said individual, said holographic means providing a first central intensity signal and a second central intensity signal in response to said incoherent illumination reflected from said input means, discriminator means for passing a first central value signal corresponding to the central value of said first central intensity signal and a second central value signal corresponding to the central value of said second central intensity signal, detector means for producing a first electrical output signal in response to said first central value signal and a second electrical output signal in response to said second central value signal, and signal processing means coupled to said detector means having a first channel which includes threshold levels that set a lower limit to said first electrical output signal and a second channel which includes threshold level that set an upper limit to said second electrical output signals for providing unambiguous correspondence between said reflected incoherent illumination and said interference patterns, said signal processing means providing an output signal indicative of the verification that said fingertip pressed against said input means is the same as said fingertip represented in said holographic means.

10. A lensless optical recognition device as described in claim 9 which includes optical means disposed between said input means and said holographic means for rotating and translating said reflected incoherent illumination with respect to said holographic means.

11. A lensless optical recognition device as described in claim 10 in which said optical means includes a dove prism.

12. An optical recognition device for identifying personnel by fingerprint verification, comprising holographic means having interference patterns produced from positive and negative transparency impressions of a fingertip of a particular individual, a point source of quasi-monochromatic illumination disposed with respect to said holographic means in the same position as said fingertip during recording of said positive and negative transparencies for producing colored images from said positive and negative transparencies a second source of illumination, input means illuminated by said second source of illumination in which a fingertip of said particular individual having said fingerprint to be verified is pressed against said input means, optical means for receiving reflected illumination from said fingerprint at said input means and producing an erect image of said fingerprint, means for superimposing said erect image of said fingerprint to be verified on first said colored image produced from said positive transparency and second on said colored image produced from said negative transparency, filter means disposed between said optical means and said erect image of said unknown fingerprint for producing an erect image of said unknown fingerprint having a color that is complementary to said colored images produced from said positive and negative transparencies, and display means to receive superimposed colored images of said unknown fingertip, said positive transparency and said negative transparency of said fingertip of a particular individual which indicates the correspondence between the fingertip pressed against the input means and said fingertip represented by said interference pattern in said holographic means.

13. An optical recognition device for identifying personnel by fingerprint verification as described in claim 12 in which said optical means for receiving reflected illumination from said fingerprint includes a lens for producing an inverted image on a reflecting surface and said reflecting surface produces an erect image of said fingerprint.

14. An optical recognition device for identifying personnel by fingerprint verification as described in claim 12 in which said means for superimposing said erect image on first said image produced from said positive transparency and second on said image produced from said negative transparency includes control means for translating and rotating said means for superimposing.

15. A method for identifying personnel by fingerprint verification comprising the steps of applying an unknown fingerprint to be verified as the fingerprint of a known individual against an input means, illuminating a hologram with a point source of quasi-monochromatic light, said hologram containing interference patterns produced from a plurality of fingerprints of known individuals and said illumination provides a plurality of positive images of a first color, each of said images corresponding to a known fingerprint, illuminating said input means with light to produce a positive image corresponding to said unknown fingerprint of a second color that is complementary to said first color, sequentially superimposing said positive image corresponding to said unknown fingerprint upon each of said plurality of positive images corresponding to said known fingerprints, and verifying that said unknown fingerprint corresponds to one of said known fingerprints by observing the absence of said first and second colors when said image from said unknown fingerprint is superimposed upon an image from said known fingerprints that corresponds to said image from said unknown fingerprint.

16. A method for identifying personnel by fingerprint verification as described in claim 14 wherein said step of illuminating a hologram with quasi-monochromatic light provides a plurality of negative images, said step for sequentially superimposing said positive image provides for sequentially superimposing said positive image upon each of said plurality of negative images, and said step for verifying is performed by observing the presence of said first and second colors when said positive image from said unknown fingerprint is superimposed on negative image from said known fingerprints that corresponds to said image from said unknown fingerprint.

17. A method for identifying personnel by fingerprint verfication as described in claim 14 wherein the step of illuminating a hologram with quasi-monochromatic light provides a plurality of positive and negative images, said step for sequentially superimposing said positive image corresponding to said unknown fingerprint provides for sequentially superimposing said positive image upon first said positive image and second said negative image of each pair of positive and negative images of said plurality of positive and negative images, and said step for verifying is performed by observing first the absence of said first and second colors when said image from said unknown fingerprint is superimposed on positive image from said known fingerprints and by observing the presence of said first and second colors when said image from said unknown fingerprint is superimposed upon negative image from said known fingerprints.

18. A method for identifying personnel by fingerprint verification as described in claim 16 wherein the step of illuminating a hologram with a point source of quasi-monochromatic light produces positive and negative images of a first color which correspond to the interference patterns in the hologram that represent a fingerprint of a single known individual.

* * * * *